United States Patent
Aratani et al.

(10) Patent No.: US 7,053,811 B2
(45) Date of Patent: May 30, 2006

(54) CONTROL APPARATUS WHICH REMOTELY CONTROLS A DEVICE IN A NETWORK SYSTEM AND CONTROL METHOD THEREFOR

(75) Inventors: Shuntaro Aratani, Tokyo (JP); Hideaki Yui, Kanagawa (JP); Tomoyuki Ohno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 814 days.

(21) Appl. No.: 10/021,534

(22) Filed: Oct. 30, 2001

(65) Prior Publication Data

US 2002/0089427 A1 Jul. 11, 2002

(30) Foreign Application Priority Data

Nov. 1, 2000 (JP) .................................... 2000-334516

(51) Int. Cl.
*G08C 19/12* (2006.01)

(52) U.S. Cl. ................. 341/173; 341/176; 348/734; 345/744; 345/840; 340/825.72

(58) Field of Classification Search ............. 341/173, 341/176; 345/744, 840; 340/825.09, 825.72; 348/164, 162, 734; 700/83; 709/220
See application file for complete search history.

(56) References Cited

U.S. PATENT DOCUMENTS

| | | | | | |
|---|---|---|---|---|---|
| 4,959,810 A | * | 9/1990 | Darbee et al. | .............. | 398/112 |
| 5,228,077 A | * | 7/1993 | Darbee | .................. | 379/102.01 |
| 5,255,313 A | * | 10/1993 | Darbee | .................. | 379/102.01 |
| 5,414,761 A | * | 5/1995 | Darbee | .................. | 379/102.01 |
| 5,552,917 A | * | 9/1996 | Darbee et al. | .............. | 398/107 |
| 5,689,353 A | * | 11/1997 | Darbee et al. | .............. | 398/112 |
| 5,953,144 A | * | 9/1999 | Darbee et al. | .............. | 398/112 |
| 5,959,751 A | * | 9/1999 | Darbee et al. | .............. | 398/112 |
| 6,211,870 B1 | * | 4/2001 | Foster | .................. | 345/744 |
| 6,657,679 B1 | * | 12/2003 | Hayes et al. | ................. | 348/734 |
| 6,690,392 B1 | * | 2/2004 | Wugoski | .................... | 345/744 |
| 6,714,220 B1 | * | 3/2004 | Sigl | ........................... | 345/780 |

* cited by examiner

*Primary Examiner*—Albert K. Wong
(74) *Attorney, Agent, or Firm*—Cowan, Liebowitz & Latman, P.C.

(57) ABSTRACT

A television receiver serves as a control which remotely controls a device in a network system, and is provided with a remote controller for remotely controlling the television receiver itself. The television receiver displays, on a display device, a graphical user interface (guide panel) for graphically guiding the functions assigned to the plural numeral keys provided in the remote controller. Such configuration allows the user to remotely control the desired AV device in the network system in a simple manner with a limited operation sequence.

12 Claims, 11 Drawing Sheets

| REMOTE CONTROL ID | DEVICE ID | NODE ID | DEVICE INFORMATION | PROGRAM ID |
|---|---|---|---|---|
| 0 0 0 0 | — | — | — | 0001 |
| 0 0 0 0 | bbbbbbbb | 3 | 04 (VCR) | 0002 |
| 0 0 0 0 | cccccccc | 5 | 03 (DVD) | 0003 |
| 0 0 0 0 | dddddddd | 2 | 03 (DVD) | 0004 |
| 0 0 0 0 | eeeeeeee | 4 | 05 (TUNER) | 0005 |
| 0 0 0 1 | — | — | — | 0010 |
| 0 0 0 1 | bbbbbbbb | 3 | 04 (VCR) | 0011 |
| 0 0 0 1 | cccccccc | 5 | 03 (DVD) | 0012 |
| 0 0 0 1 | dddddddd | 2 | 03 (DVD) | 0013 |
| 0 0 0 1 | eeeeeeee | 4 | 05 (TUNER) | 0014 |

FIG. 14

| REMOTE CONTROL ID | DEVICE ID | NODE ID | DEVICE INFORMATION | PROGRAM ID (1) | PROGRAM ID (2) | PROGRAM ID (3) |
|---|---|---|---|---|---|---|
| 0 0 0 0 | — | — | — | 0001 | 0101 | 0201 |
| 0 0 0 0 | bbbbbbbb | 3 | 04 (VCR) | 0002 | 0102 | 0202 |
| 0 0 0 0 | cccccccc | 5 | 03 (DVD) | 0003 | 0103 | 0203 |
| 0 0 0 0 | dddddddd | 2 | 03 (DVD) | 0004 | 0104 | 0204 |
| 0 0 0 0 | eeeeeeee | 4 | 05 (TUNER) | 0005 | 0105 | 0205 |

CONTROL APPARATUS WHICH REMOTELY CONTROLS A DEVICE IN A NETWORK SYSTEM AND CONTROL METHOD THEREFOR

BACKGROUND OF THE INVENTION

1. Field of the Invention

The present invention relates to a control apparatus and a control method for remote controlling AV (audio/video) device in a host network system.

2. Related Background Art

In the conventional home network system, there has most commonly been employed a method of remote controlling the desired AV device utilizing a cursor key for vertically and laterally moving a cursor displayed on the graphical user interface and a determination key for instructing the execution of a function corresponding to an icon selected by the cursor.

However such method requires several depressions of the cursor key until the execution of the desired function can be instructed and has therefore a drawback of requiring time.

SUMMARY OF THE INVENTION

An object of the present invention is to solve the above-described drawbacks.

Another object of the present invention is to provide a control apparatus and a control method enabling simple remote control of the AV device in the home network system by a limited operation sequence.

The above-mentioned objects can be attained, according to a preferred embodiment of the present invention, by a control apparatus which remotely controls a device in a network system, that comprises: a remote controller for remotely controlling said control apparatus; communication means for downloading a control program for remotely controlling an unknown device; and control means for generating, according to the downloaded control program, a graphical user interface for graphically displaying functions assigned to a plurality of keys provided in said remote controller.

According to another preferred embodiment of the present invention, there is also provided a control method for a control apparatus which remotely controls a device in a network system, and has a remote controller for remotely controlling said control apparatus, and the method comprises steps of: downloading a control program for remotely controlling an unknown device; and generating, according to the downloaded control program, a graphical user interface for graphically displaying functions assigned to a plurality of keys provided in said remote controller.

According to a further preferred embodiment of the invention, there is provided a control apparatus which remotely controls a device in a network system, that comprises: a remote controller adapted to remotely control said control apparatus; a communication unit adapted to download a control program for remotely controlling an unknown device; and a control unit coupled to said communication unit, and adapted to generate, according to the downloaded control program, a graphical user interface for graphically displaying functions assigned to a plurality of keys provided in said remote controller.

Still other objects of the present invention, and the advantages thereof, will become fully apparent from the following detailed description of the embodiments.

DETAILED DESCRIPTION OF THE PREFERRED EMBODIMENTS

In the following there will be given a detailed description on preferred embodiments of the present invention with reference to the accompanying drawings.

Figure 1:
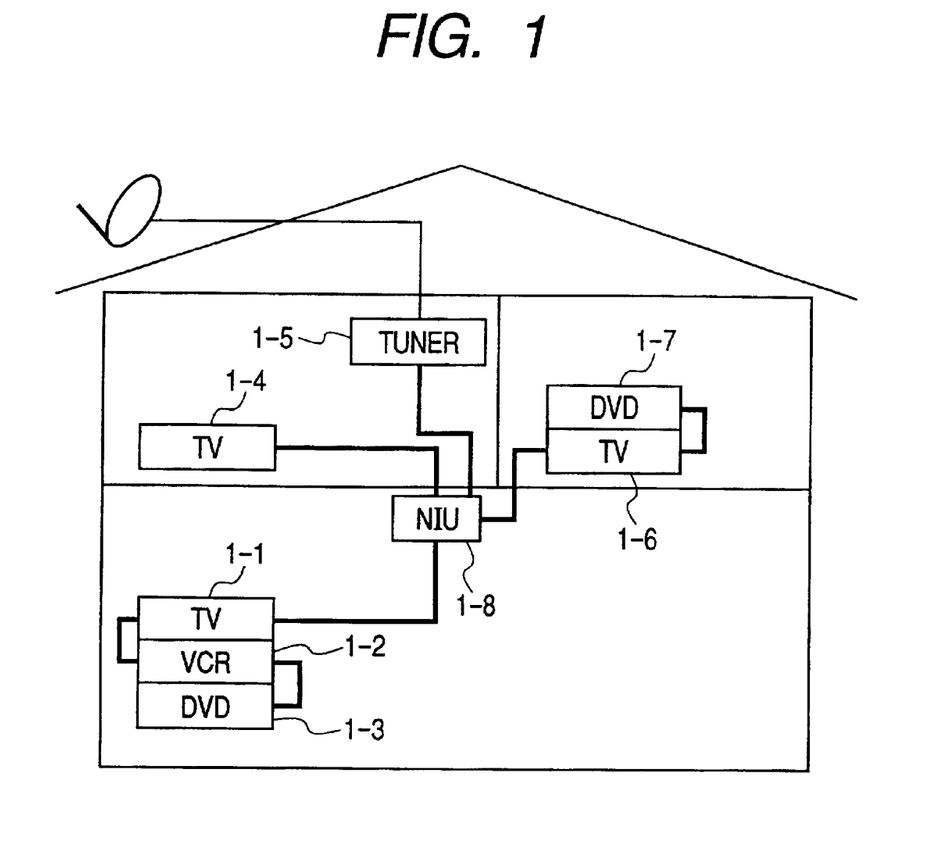
FIG. 1 is a view showing the configuration of a home network system embodying the present invention.

FIG. 1 is a view showing the configuration of a home network system embodying the present invention. In the home network system of the present embodiment, there are connected at least 7 AV (audio/video) devices and at least a network interface unit. Also the home network system of the present embodiment is based on the IEEE 1394-1995 standard and its expansions (IEEE1394a-2000 etc.). Consequently, all the AV devices in the home network system shown in FIG. 1 are provided with a digital interface based on the IEEE 1394-1995 standard and its expansions (IEEE1394a-2000 etc.) (such interface being hereinafter called IEEE 1394 interface).

Referring to FIG. 1, there are provided AV devices consisting of first television receivers 1-1, 1-4, 1-6 (hereinafter represented as TV), a digital video cassette recorder (VCR) 1-2, DVD (digital versatile disk) players (DVD) 1-3, 1-7, a digital television tuner (TUNER) 1-5, and a network interface unit (NIU) 1-8. The TV's 1-1, 1-4 and 1-6 are control devices for remote controlling the AV devices (VCR 1-2, DVD 1-3, TUNER 1-5 and DVD 1-7) present in the home network system.

Figure 2:
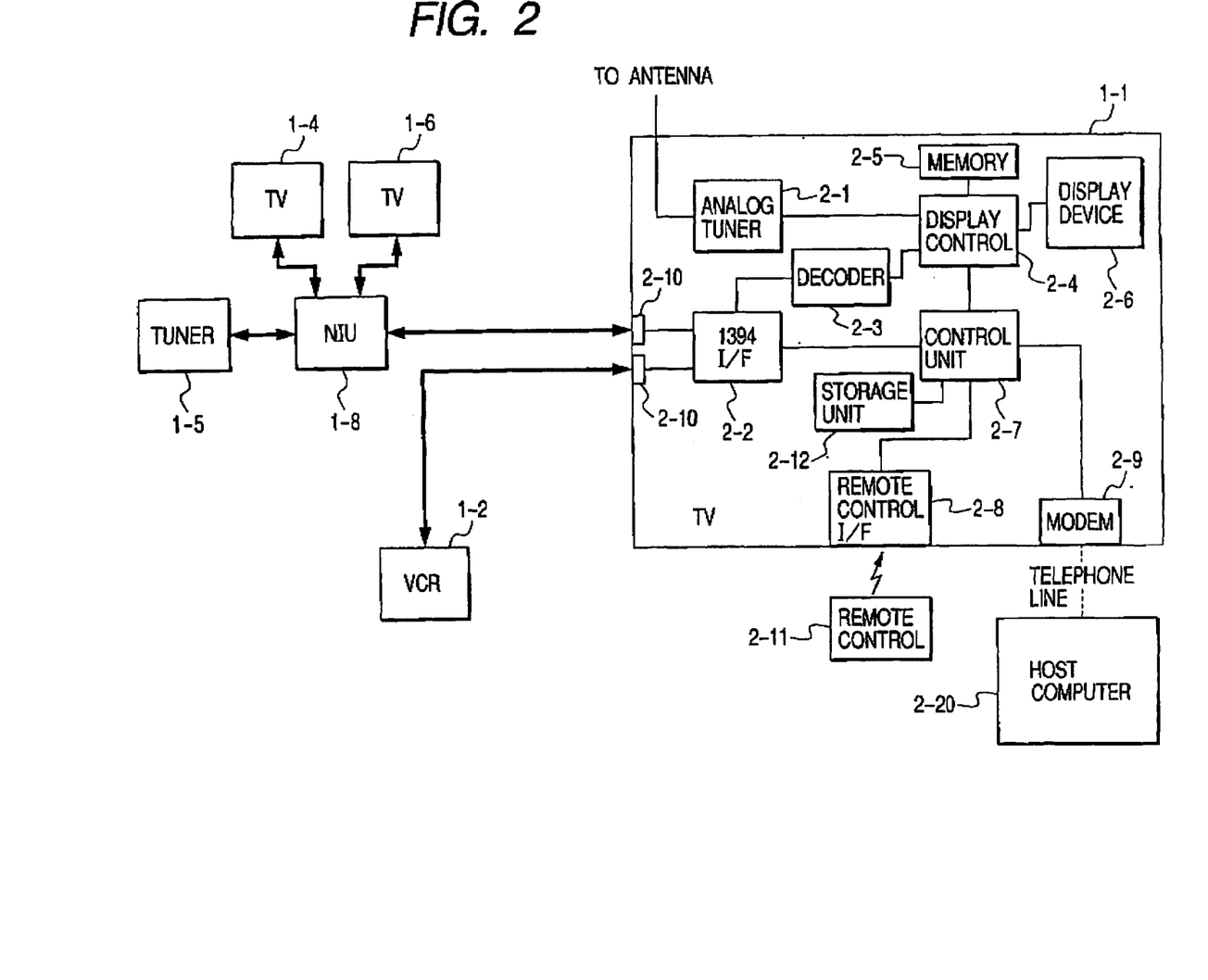
FIG. 2 is a block diagram showing the configuration of TV 1-1.

FIG. 2 shows the configuration of the TV 1-1. The TV's 1-4 and 106 have a configuration similar to that of the TV 1-1. There are provided an analog tuner 2-1 for selecting an analog television broadcasting station of a predetermined channel and converting the channel into video data and audio data; an IEEE 1394 interface 2-2; a decoder unit 2-3 for converting video stream data and audio stream data supplied from the IEEE 1394 interface 2-2 into video data and audio data; a display unit 2-6 which is provided with a CRT, a liquid crystal display panel etc. and which can be of an incorporated type or an externally added type; a display control unit 2-4 for generating video data to be displayed on the display unit 2-6; a control unit 2-7 provided with a microcomputer and a memory; a remote controller 2-11 for remote controlling the TV 1-1; a remote control interface 2-8 for receiving a wireless signal transmitted from the remote controller 2-11; a host computer 2-20 for distributing a remote control program adaptable to the AV devices of various kinds; a modem 2-9 for executing data communication with the host computer 2-20 in a distant location through a telephone line or the internet; a connector 2-10 for the IEEE 1394 interface 2-2; and a memory unit 2-12 for storing remote control programs for remote controlling the VCR 1-2, DVD 1-3, TUNER 1-5 and DVD 1-7 through the remote controller 2-11; and a program management table for managing the remote control programs.

Figure 3:
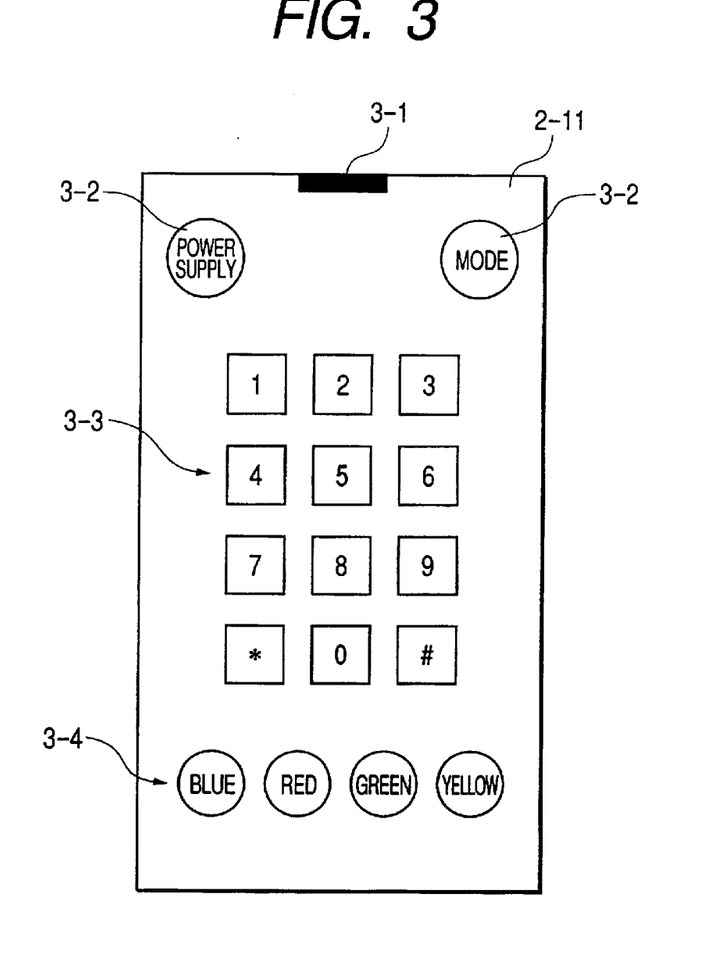
FIG. 3 is a view showing a remote controller 2-11.

FIG. 3 is a view showing the remote controller 2-11. There are provided a transmission unit 3-1 for transmitting a wireless signal to the remote control interface 2-8 of the TV 1-1; a power supply key 3-2 for turning on or off the power supply for the TV 1-1; numeral keys 3-3 in a 3×4 matrix, consisting of "1" key, "2" key, . . . "*" key and "#" key; four color keys 3-4 consisting of a blue key, a red key, a green key and a yellow key; and a mode key 3-5 for selecting remote control modes for remote controlling the AV devices in the home network.

Figure 4:
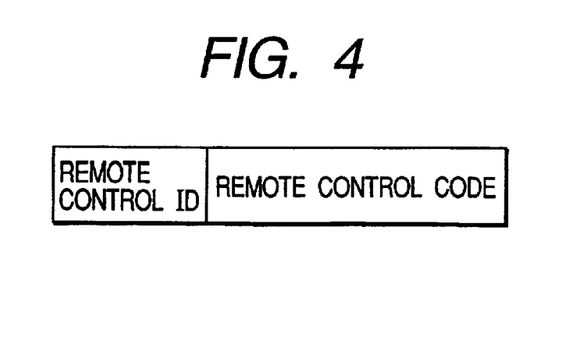
FIG. 4 is a view showing a wireless signal transmitted from the remote controller 2-11 to the TV 1-1.

FIG. 4 shows the wireless signal transmitted from the remote controller 2-11 to the TV 1-1. As shown in FIG. 4, the wireless signal is composed of a combination of a remote control ID and a remote control mode. The remote control ID is ID information for identifying the type of the remote controller for remote controlling the TV 1-1. In the present embodiment, the remote control ID of the remote controller 2-11 is assumed as "0000". Also the remote control mode is code information for identifying the kind of the key operated by the user.

Figure 5:
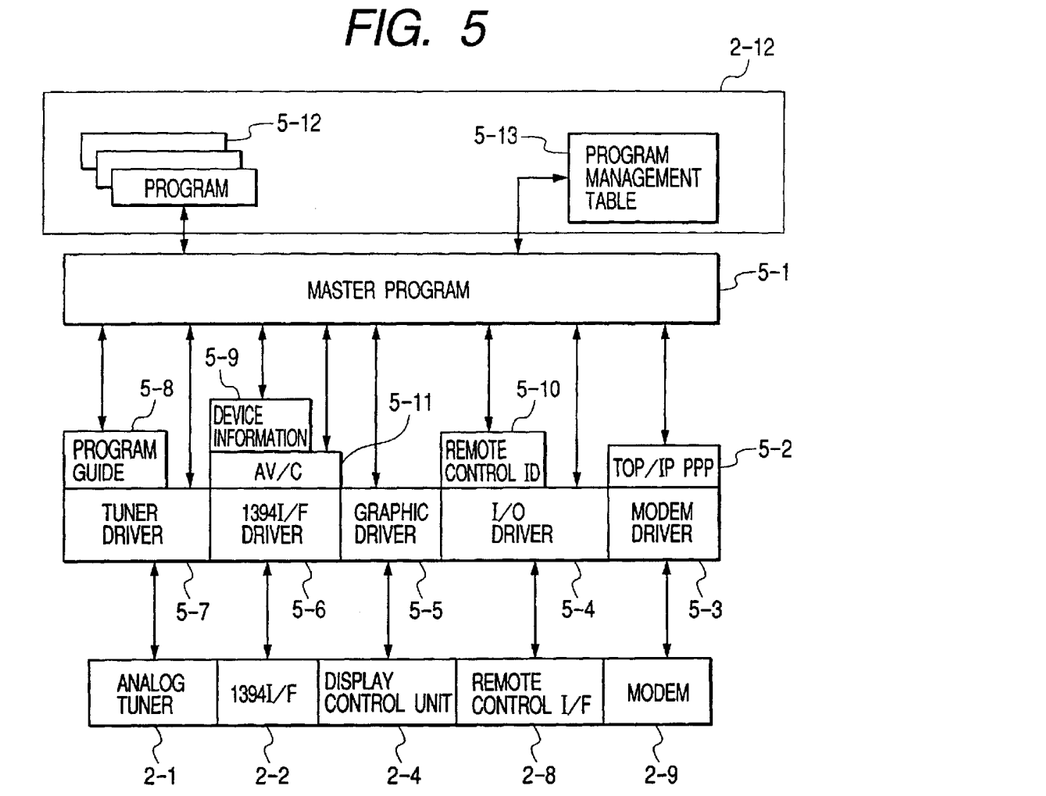
FIG. 5 is a view showing a program to be executed by a control unit 2-7.

In the following there will be given an explanation on the program to be executed by the control unit 2-7. There are provided a master program 5-1 for controlling various functions provided in the TV 1-1; a program 5-2 for controlling communication protocols such as TCP/IP, PPP (point-to-point protocol) etc.; a driver 5-3 for controlling the modem 2-9; a driver 5-4 for controlling the remote control interface 2-8; a driver 5-5 for controlling the display control unit 2-4; a driver 5-6 for controlling the IEEE 1394 interface 2-2; a driver 5-7 for controlling the TUNER 2-1; a program 5-8 for managing electronic program guide information; a program 5-9 for managing device information of the AV devices; a remote control ID identification program 5-10 for detecting the remote control ID from the remote control signal; a program 5-11 for controlling various communication protocols defined in the upper layer of the IEEE 1394-1995 standard (for example FCP (function control protocol) defined in the IEC 1883-1 standard), the AV/C (audio video/control) protocol defined in the above-mentioned protocol and the SBP-2 (serial bus protocol-2); remote control programs 5-12 respectively corresponding to the VCR 1-2, DVD 1-3, TUNER 1-5 and DVD 1-7 and adapted to generate a guide panel for graphically guiding the remote controllable functions assigned to the plural numeral keys provided in the remote controller; and a program management table 5-13 for managing the remote control programs 5-12 of the AV devices.

Figure 6:
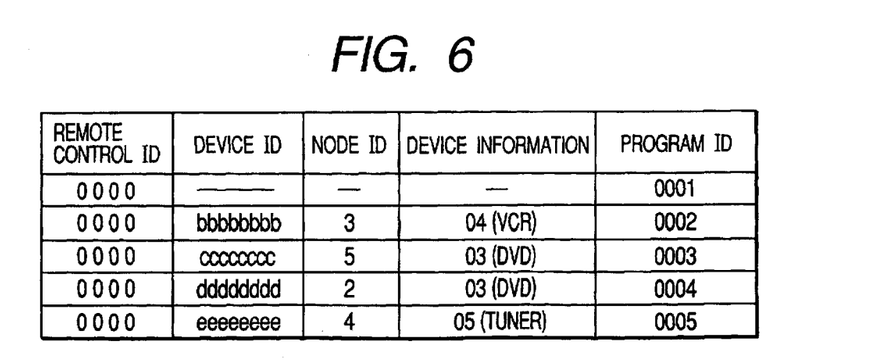
FIG. 6 is a view showing the content of a program management table 5-13.

In the following there will be given an explanation on the content of the program management table 5-13 managed by the master program 5-1, with reference to FIG. 6. As shown in FIG. 6, The items managed by the program management table 5-13 include the remote control ID, device ID, node ID, device information and program ID. The remote control ID is ID information for identifying the type of the remote controller. The remote control ID can be detected from the aforementioned remote control signal. The device ID is ID information for identifying the manufacturer and the device type of the AV device. In the present embodiment, the node vendor ID, module vendor ID or module specification ID stored in a configuration ROM provided in the IEEE 1394 interface is utilized as the device ID. The device information is information relating to each AV device and contains, for example, information on a sub unit (functional unit) provided in the AV device. The node number is ID information for identifying the node defined in the IEEE 1394-1995 standard. The program ID is ID information for identifying the remote control program. The master program 5-1 checks the content of the program management table 5-1 and renews the content if necessary, whenever the power supply of the TV 1-1 is turned on or a bus resetting defined in the IEEE 1394-1995 standard is generated.

Figure 7:
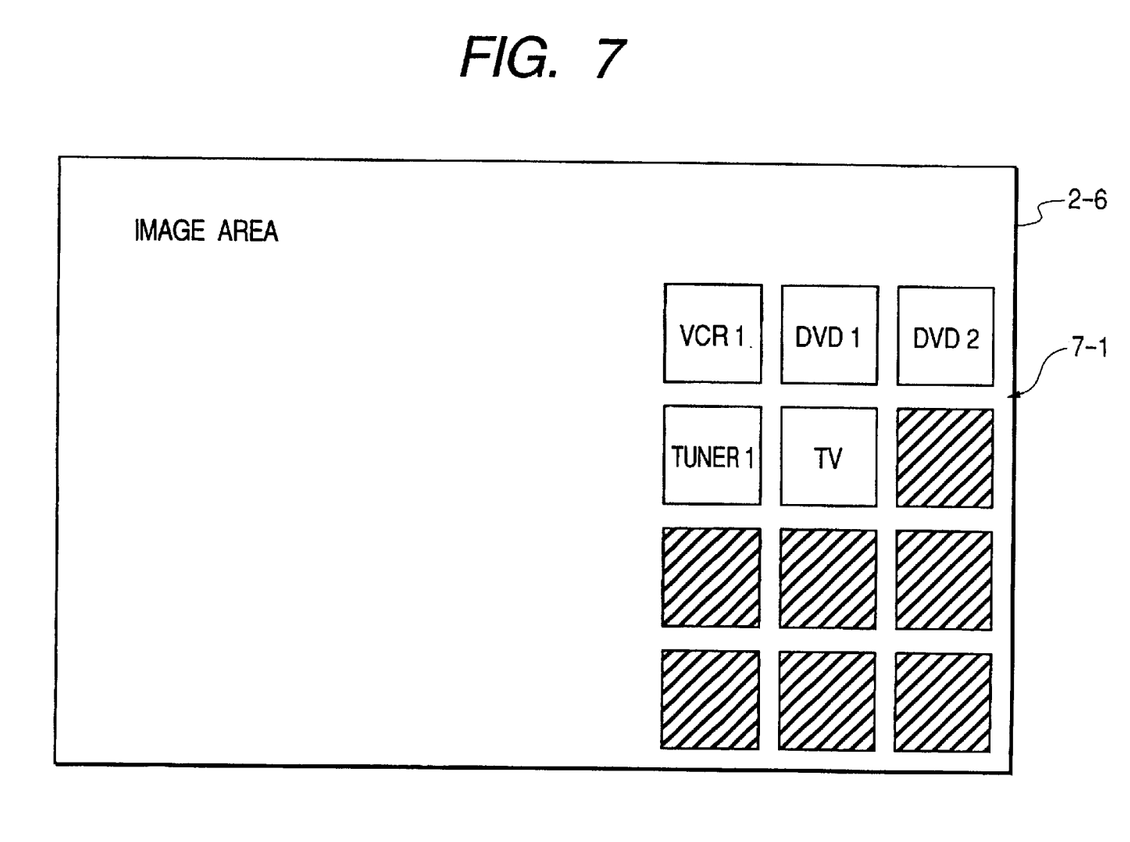
FIG. 7 is a view showing a guide panel for selecting an AV device to be remote controlled.
Figure 8:
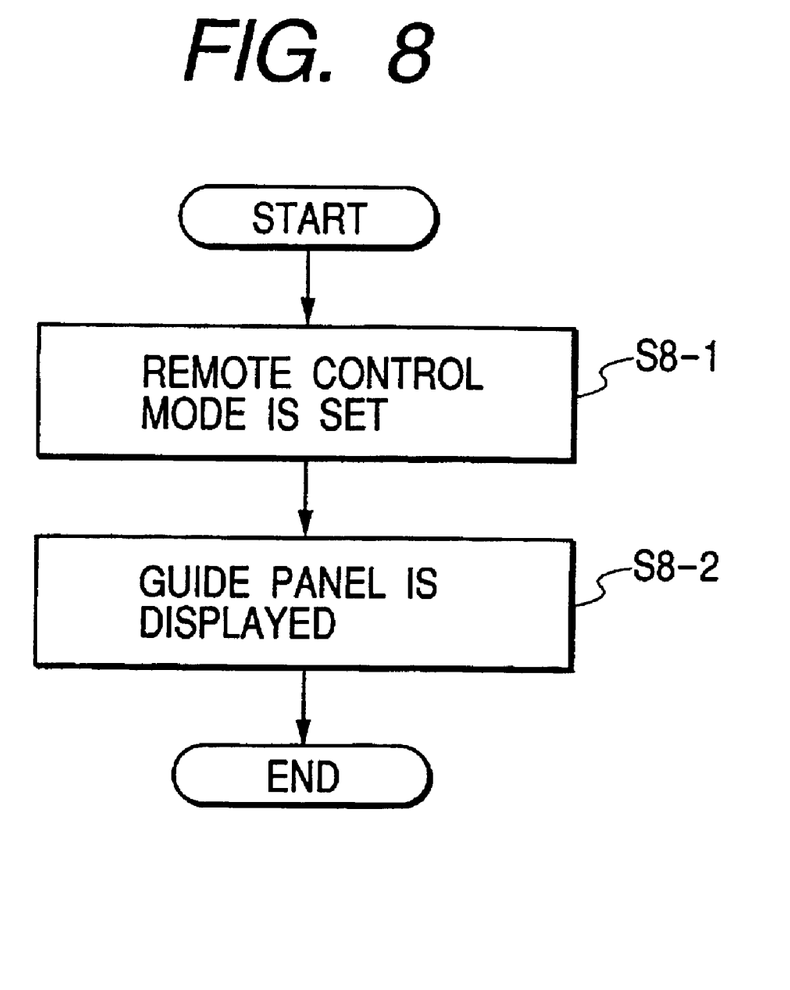
FIG. 8 is a flow chart showing the process sequence of a remote control program for the TV 1-1.

In the following there will be explained, with reference to FIGS. 7 and 8, the procedure for selecting an AV device to be remote controlled by the remote controller 2-11.

Step S8-1: Upon detecting the depression of the key 3-5 of the remote controller 2-11, the master program 5-1 assumes a remote control mode for remote controlling the AV device on the home network and executes a remote control program 1 (program ID="0001").

Step S8-2: The remote control program 1 generates a guide panel corresponding to the numeral key 3-3 of the remote controller 2-11 and displays it on the display device 2-6. An example of the guide panel generated by the remote control program 1 is shown in FIG. 7. The guide panel 7-1 is a graphical user interface for graphically guiding the AV devices assigned to the twelve numeral keys provided in the remote controller 2-11. As shown in FIG. 7, the twelve icons arranged on the guide panel 7-1 are same as the twelve numeral keys arranged on the remote controller 2-11. Also the twelve icons arranged on the guide panel 7-1 indicate the AV devices assigned to the numeral keys corresponding to the respective icons. FIG. 7 indicates that the key "1" is assigned to the VCR 1-2, the key "2" to the DVD 1-3, the key "3" to the DVD 1-7, the key "4" to the TUNER 1-5 and the key "5" to the TV 1-1. Other hatched icons indicate that they are not assigned. The display of the graphical user interface such as the guide panel 7-1 on the display unit 2-6 facilitates intuitive operation, and allows the user to easily select the desired AV device by a single operation.

For example, in case of wishing to remote control the VCR 1-2, the user is only required to depress the key "1" of the remote controller 2-11. Detecting the depression of the key "1" of the remote controller 2-11, the master program 5-1 executes a remote control program 2 (program ID="0002") corresponding to the remote controller 2-11 and the VCR 1-2. Also in case of remote controlling the DVD 1-3, the user is only required to depress the key "2" of the remote controller 2-11. Detecting the depression of the key "2" of the remote controller 2-11, the master program 5-1 executes a remote control program 3 (program ID="0003") corresponding to the remote controller 2-11 and the DVD 1-3. Also in case of remote controlling the DVD 1-3, the user is only required to depress the key "3" of the remote controller 2-11. Detecting the depression of the key "3" of the remote controller 2-11, the master program 5-1 executes a remote control program 4 (program ID="0004") corresponding to the remote controller 2-11 and the DVD 1-7. Also in case of remote controlling the TUNER 1-5, the user is only required to depress the key "4" of the remote controller 2-11. Detecting the depression of the key "4" of the remote controller 2-11, the master program 5-1 executes a remote control program 5 (program ID="0005") corresponding to the remote controller 2-11 and the TUNER 1-5. Also in case of remote controlling the TV 1-1 itself, the user is only required to depress the key "5" of the remote controller 2-11.

Figure 10:
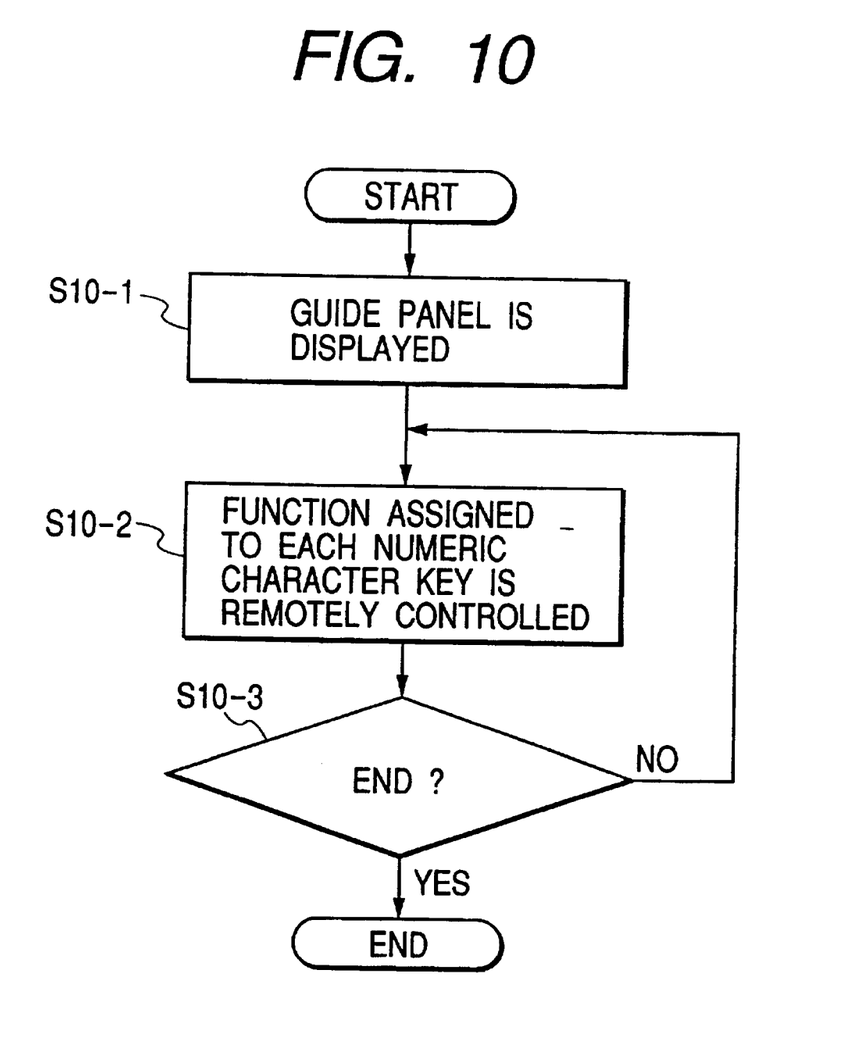
FIG. 10 is a flow chart showing the process sequence of the remote control program for the VCR 1-2.

In the following there will be explained the process sequence of the remote control program 2 (program ID="0002") with reference to FIG. 10. Other remote control programs are also executed in a similar manner as the remote control program 2.

Figure 9:
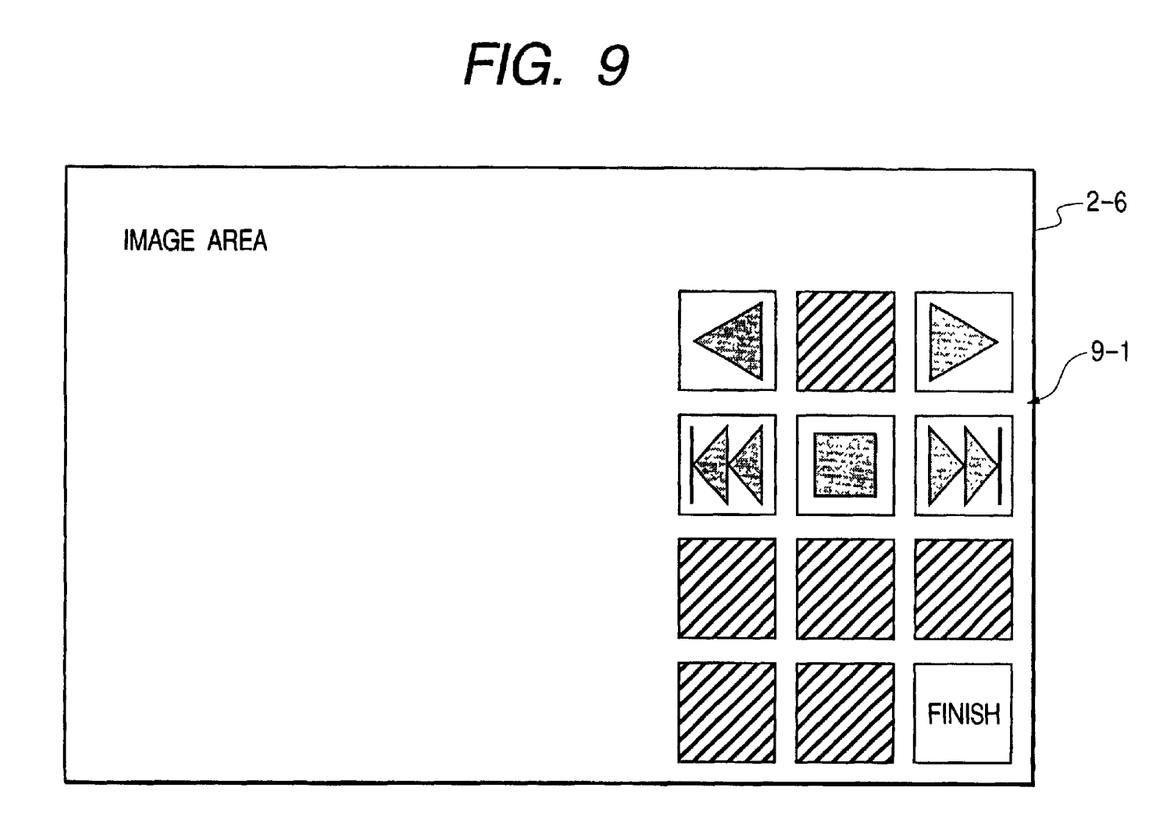
FIG. 9 is a view showing a guide panel to be displayed by a remote control program for a VCR 1-2.

Step S10-1: The remote control program 2 generates a guide panel corresponding to the numeral keys 3-3 of the remote controller 2-11 and displays it on the display device 2-6. An example of the guide panel generated by the remote control program 2 is shown in FIG. 9. The guide panel 8-1 is a graphical user interface for graphically guiding the remote controllable functions assigned to the twelve numeral keys provided in the remote controller 2-11. As shown in FIG. 9, the twelve icons arranged on the guide panel 9-1 are same as the twelve numeral keys arranged on the remote controller 2-11. Also the twelve icons arranged on the guide panel 9-1 indicate the functions assigned to the numeral keys corresponding to the respective icons. FIG. 9 indicates that the key "1" is assigned to a function for reproduction in the reverse direction, the key "3" to a function for reproduction in the forward direction, the key "4" to a function for fast reversing, the key "5" to stopping and the key "6" to fast forwarding. Other hatched icons indicate that they are not assigned. The display of the graphical user interface such as the guide panel 9-1 on the display unit 2-6 facilitates intuitive operation, and allows the user to easily select the desired AV device by a single operation.

Step S10-3: The remote control program 2 discriminates whether the remote control process utilizing the guide panel 9-1 is to be terminated, and terminates the remote control process when the key "#" is depressed.

Figure 11:
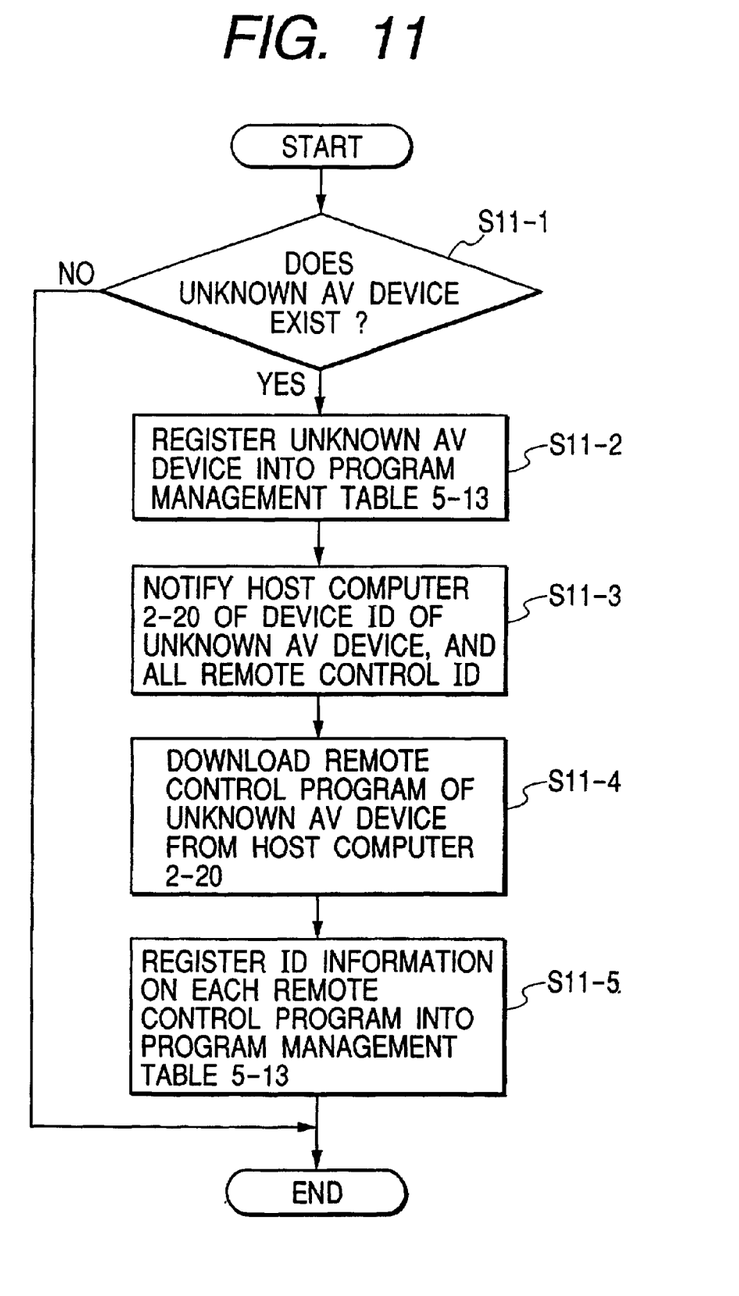
FIG. 11 is a view showing the process sequence of a master program 5-1 in case an unknown AV device is connected to the home network system.

In the following there will be explained, with reference to FIG. 11, a process sequence of the master program 5-1 when the user connects an unknown AV device to the home network system shown in FIG. 1. The unknown AV device means an AV device not registered in the program management table 5-13.

Step S11-1: When an unknown AV device is connected to the home network system shown in FIG. 1, all the AV devices in the home network system automatically execute a bus resetting (initialization and re-recognition of topology) defined in the IEEE 1394-1995 standard. After the bus resetting, the master program 5-1 discriminates whether an unknown AV device is present in the home network system shown in FIG. 1. If present, the present flow chart proceeds to a step S11-2.

Step S11-2: The master program 5-1 registers the node ID, device ID and device information of the unknown AV device in the program management table 5-13.

Step S11-3: The master program 5-1 makes access to the host computer 2-20 and informs the host computer 2-20 of all the remote control ID's registered in the program management table 5-13 and the device ID of the unknown AV device. Utilizing all the remote control ID's informed from the TV 1-1, the host computer 2-20 can specify the types of all the remote controllers registered in the program management table 5-13. Also utilizing the device ID of the unknown AV device informed from the TV 1-1, the host computer 2-20 can specify the manufacturer and type of the unknown AV device.

Step S11-4: The master program 5-1 downloads, from the host computer 2-20, for remote controlling the unknown AV device. The remote control program for the unknown AV device, like those for other AV devices, has a content different for each type of the remote controller. Consequently, the master program 5-1 downloads, from the host computer 2-20, the remote control programs corresponding to all the remote controllers registered in the program management table 5-13.

Step S11-5: The master program 5-1 stores the remote control programs in the memory unit 2-12 and registers the ID information of the remote control programs in the program management table 5-13.

The above-described process sequence allows the TV 1-1 of the present embodiment to automatically download the remote control program for remote controlling the unknown AV device from the host computer 2-20 even in case the unknown AV device is connected to the home network system shown in FIG. 1.

Figure 12:
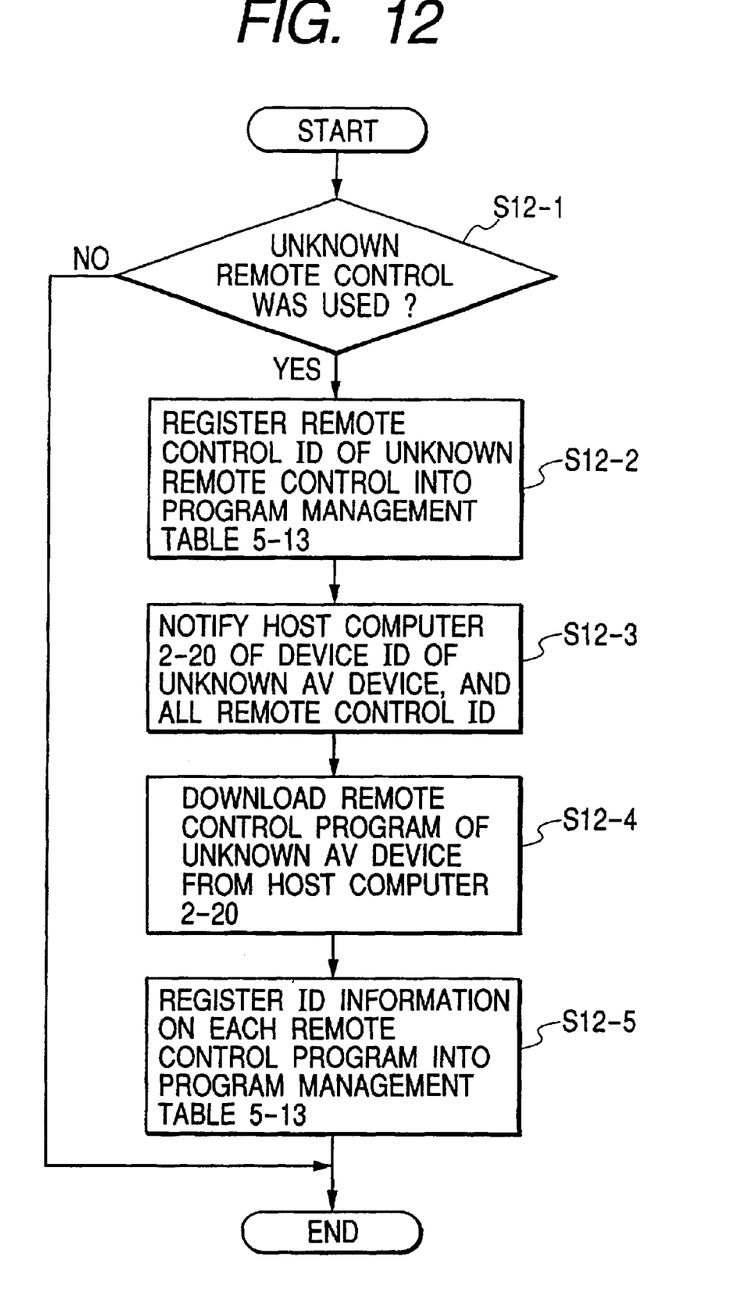
FIG. 12 is a view showing the process sequence of the master program 5-1 in case an unknown remote controller is used.

In the following there will be explained, with reference to FIG. 12, the process sequence of the master program 5-1 in case the user uses an unknown remote controller. The unknown remote controller means a remote controller which is not registered in the program management table 5-13.

Step S12-1: The master program 5-1 discriminates whether an unknown remote controller is used. If used, the present flow chart proceeds to a step S12-2.

Step S12-2: The master program 5-1 registers the remote control ID of the unknown remote controller in the program management table 5-13. In the present embodiment, the remote control ID of the unknown remote controller is assumed as "0001".

Step S12-3: The master program 5-1 makes an access to the host computer 2-20 and informs the host computer 2-20 of the device ID's of all the AV devices registered in the program management table 5-13 and the remote control ID of the unknown remote controller. Utilizing the devices ID's of all the AV devices informed from the TV 1-1, the host computer 2-20 can specify the manufacturers and types of all the AV devices in the home network. Also utilizing the remote control ID of the unknown remote controller, the host computer 2-20 can specify the type of the unknown remote controller.

Step S12-4: The master program 5-1 down loads the remote control programs for the AV devices from the host computer 2-20. Such remote control programs can generate a guide panel for graphically guiding the remote controllable functions assigned to the plural numeral keys provided in the unknown remote controller. Such remote control programs are stored in the memory unit 2-12.

Figure 13:
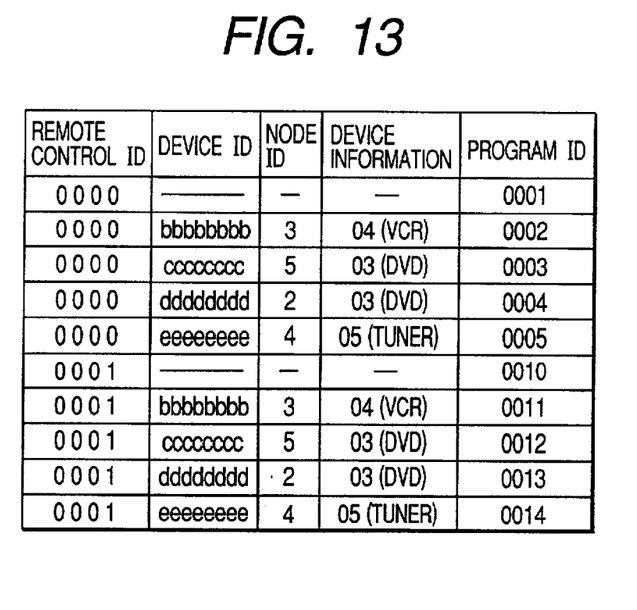
FIGS. 13 and 14 are views showing the content of the program management table 5-13.

Step S12-5: The master program 5-1 registers a remote control program corresponding to the unknown remote controller in the program management table 5-13. FIG. 13 shows the content of the program management table 5-13 in this state.

The above-described process sequence allows the TV 1-1 of the present embodiment to automatically download the remote control program corresponding to the unknown remote controller from the host computer 2-20 even in case the unknown remote controller is used.

Figure 14:
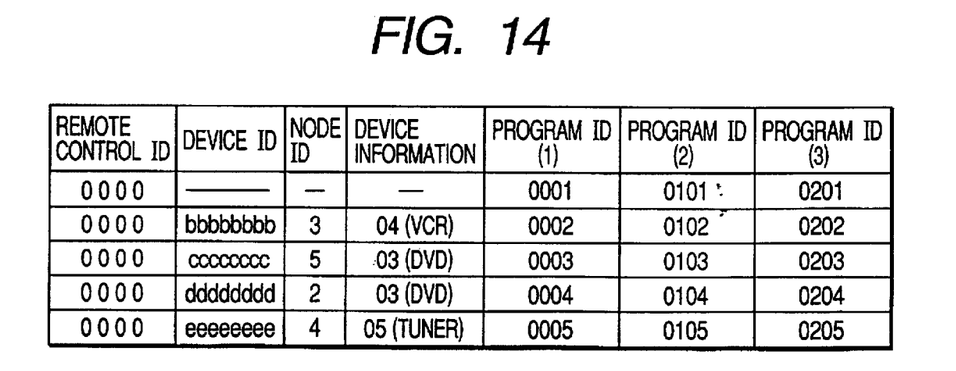

The master program 5-1 of the present embodiment can also register plural remote control programs for each AV device, as shown in FIG. 14. Each remote control program for example has a different design in the guide panel displayed on the display unit 2-6. FIG. 14 shows the content of the program management table 5-13 registering three different remote control programs for each of the VCR 1-2, DVD 1-3, DVD 1-7 and TUNER 1-5.

As explained in the foregoing, the TV 1-1 of the present embodiment allows to simply remote control various AV devices in the home network system by limited operation sequences. In particular the graphical user interface such as the guide panel of the present embodiment is capable of significantly reducing the number of operations by the user, in comparison with the conventional graphical user interface utilizing the combination of the cursor key and the determination key, thereby enabling to operate the desired function in a speedy manner. It is also possible to alleviate the burden on the user.

Also the TV 1-1 of the present embodiment is capable of dynamically responding even to the unknown AV device, and remote controlling the unknown AV device according to an optimum guide panel. Furthermore, the TV 1-1 of the present embodiment is capable of dynamically responding even to the unknown remote controller, and remote controlling the desired AV device according to a guide panel optimum to the unknown remote controller.

The invention may be embodied in other specific forms without departing from essential characteristics thereof.

For example, in the foregoing embodiment, there has been explained a case of generating a guide panel provided with icons corresponding to the numeral keys 3-3, but the configuration of the guide panel is not limited to such case. For example, there may be generated a guide panel provided with icons corresponding to the numeral keys 3-3 and the color keys 3-4.

Also, the home network system of the foregoing embodiment is not limited to the home network system based on the IEEE 1394-1995 standard arid its expansions (for example IEEE 1394a-2000 standard). For example, it is applicable also to the home network systems based on the various ethernet standards, the IEEE 802.11a standard, the IEEE 802.11b standard, etc.

Also the modem 2-9 may be replaced by a DSU (digital service unit).

Therefore, the above-described embodiments are merely exemplary of this invention, and are not to be construed to limit the scope of the present invention.

The scope of the present invention is defined by the scope of the appended claims, and is not limited to only the specific descriptions in this specification. Furthermore, all the modifications and changes belonging to equivalents of the claims are considered to fall within the scope of the present invention.

What is claimed is:

1. A control apparatus which remotely controls a device in a network system, comprising:
    a remote controller for remotely controlling said control apparatus;
    communication means for downloading a control program for remotely controlling an unknown device; and
    control means for generating, according to the downloaded control program, a graphical user interface for graphically displaying functions assigned to a plurality of keys provided in said remote controller.

2. A control method for a control apparatus which remotely controls a device in a network system and has a remote controller for remotely controlling said control apparatus, said method comprising steps of:
    downloading a control program for remotely controlling an unknown device; and
    generating, according to the downloaded control program, a graphical user interface for graphically displaying functions assigned to a plurality of keys provided in said remote controller.

3. An apparatus according to claim 1, wherein said communication means starts to perform a process of downloading the control program if said control apparatus detects that said unknown device is connected to the network system.

4. An apparatus according to claim 1, wherein said control apparatus is a television receiver.

5. An apparatus according to claim 4, wherein said communication means start to perform a process of downloading the control program if said control apparatus detects the said unknown device is connected to the network system.

6. A method according to claim 2, wherein said downloading step starts to perform a process of downloading the control program if said control apparatus detects that said unknown device is connected to the network system.

7. A method according to claim 2, wherein said control apparatus is a television receiver.

8. A method according to claim 7, wherein said downloading step starts to perform a process of downloading the control program if said control apparatus detects that said unknown device is connected to the network system.

9. A control apparatus which remotely controls a device in a network system, comprising:
    a remote controller adapted to remotely control said control apparatus;
    a communication unit adapted to download a control program for remotely controlling an unknown device; and
    a control unit coupled to said communication unit, and adapted to generate, according to the downloaded control program, a graphical user interface for graphically displaying functions assigned to a plurality of keys provided in said remote controller.

10. An apparatus according to claim 9, wherein said communication unit starts to perform a process of downloading the control program if said control apparatus detects that said unknown device is connected to the network system.

11. An apparatus according to claim 9, wherein said control apparatus is a television receiver.

12. An apparatus according to claim 11, wherein said communication unit starts to perform a process of downloading the control program if said control apparatus detects that said unknown device is connected to the network system.

* * * * *